United States Patent Office
2,949,467
Patented Aug. 16, 1960

2,949,467
PERINONE TRIAZINO DYESTUFFS

Max Staeuble, Basel, Switzerland, assignor to Ciba Limited, Basel, Switzerland

No Drawing. Filed Mar. 11, 1958, Ser. No. 720,554

Claims priority, application Switzerland Mar. 18, 1957

5 Claims. (Cl. 260—249.5)

The present invention provides, as new dyestuffs, perinone dyestuffs which contain at least one acid group imparting solubility in water and at least one radical containing at least one mobile halogen atom.

The term "perinone dyestuffs" denotes dyestuffs that contain one of the two groupings

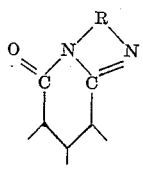

I and

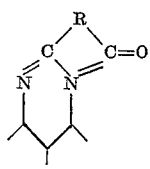

II in which R represents an aromatic radical fused on in ortho- or peri-position. Such compounds are obtained by condensing an aromatic ortho- or peri-dicarboxylic acid or a functional derivative thereof with an ortho- or peri-diamine.

Of special value are those perinone dyestuffs that contain the group of the formula (1)

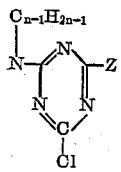

in which $n$ is a whole number not exceeding 5 and Z represents an unsubstituted or substituted hydroxyl group or an unsubstituted or preferably substituted amino group or a chlorine atom.

The new dyestuffs are obtained by reacting a perinone which contains at least one acylatable amino group with a compound containing at least 2 mobile halogen atoms, and, if desired, replacing in the compound so obtained one or more mobile halogen atoms by another substituent or substituents, the starting materials being chosen so that at least one of them contains an acid group imparting solubility in water, and the process being carried out in such manner that the final product contains at least one mobile halogen atom.

As compounds containing at least 2 mobile halogen atoms there are advantageously used compounds containing a six-membered heterocyclic ring containing at least 2 nitrogen atoms, for example, dichloro-1:3-diazines and more especially trichloro-1:3:5-triazine (cyanuric chloride). As a compound containing aliphatically bound mobile halogen atoms there may be mentioned β-chloropropionyl chloride. Instead of cyanuric chloride, a primary condensation product thereof may be used which contains 2 chlorine atoms and, in place of the third chlorine atom, an amino group or an organic radical, for example, the radical of an amine. Alternatively, dyestuffs containing a single mobile chlorine atom can be made by using as starting material a dichloro-triazine dyestuff and exchanging one of the chlorine atoms by reaction with ammonia or an aliphatic or aromatic amino- or hydroxy-compound.

The compound used as starting materials that contains at least one acylatable amino group advantageously also contains an acid group imparting solubility in water, for example, a carboxylic acid group or sulfonic acid group. If that compound contains no acid group imparting solubility in water, such a group must be present in the second reaction component. As stated above the perinones used in the process of this invention belong to two main classes represented by the Formulae I and II. The following are the basic types of compounds belonging to those classes:

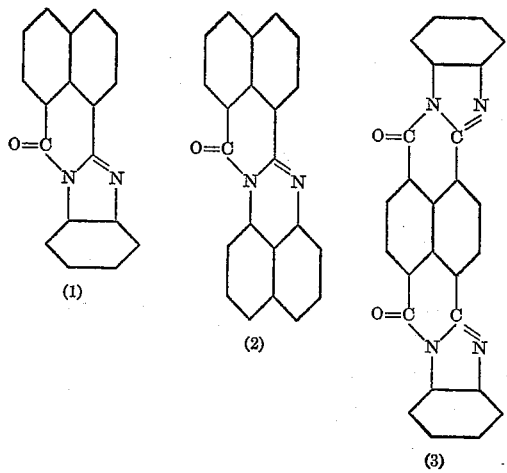

(1)

(2)

(3)

(5)

(4)

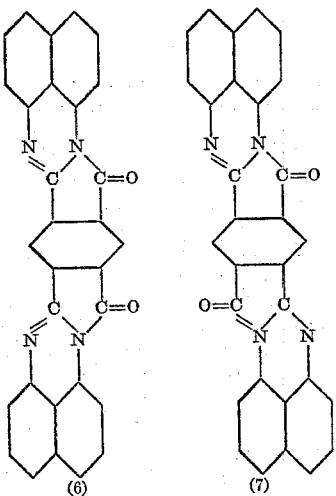

(6)            (7)

These basic types may contain further fused-on aromatic or heterocyclic rings. The aforesaid basic types must contain an acylatable amino group which may be attached to an aromatic nucleus directly or through a bridge, for example, an alkylene, alkylene-amino- or alkylene-hydroxy group. The same applies to the groups imparting solubility in water, if present.

Especially suitable starting materials are perinones that contain an amino group bound to a fused-on benzene ring. Such compounds are easily obtainable by condensing a triamino-aryl-compound containing 2 amino groups in ortho-position, for example, 1:2:3- or 1:2:4-triaminobenzene or 1:2:4-triamino-benzene-sulfonic acid, with a peri-dicarboxylic acid, for example, naphthalene-1:8-dicarboxylic acid; or by condensing a nitro- or acylamino-phthalic or naphthalic acid with a peri- or ortho-diamine followed by conversion of the nitro or acylamino group into the amino group. Groups imparting solubility in water may be introduced by sulfonating the aminoperinones. It is, however, preferable first to sulfonate a nitro-perinone and subsequently to reduce the nitro group to the amino group. Perinones containing carboxyl groups are advantageous as starting materials, and they are obtained by condensing, for example, 1 molecular proportion of naphthalene-1:4:5:8-tetracarboxylic acid with 1 molecular proportion of an ortho- or peri-diamine, or by condensing 1 molecular proportion of 1:4:5:8-naphthalene-tetracarboxylic acid with 2 molecular proportions of an ortho-diamino-benzene-monocarboxylic acid.

In addition to the aforesaid substituents the perinones may contain further susbtituents, for example, halogen atoms or hydroxyl or alkoxy groups.

The reaction of the perinones with the compound containing at least 2 mobile halogen atoms is advantageously carried out in aqueous solution at a relatively low temperature in the presence of an acid-binding agent, for example, an alkali metal carbonate, the quantity of which must be such that pH value of the solution does not exceed 7. At a higher pH value there is a risk of all mobile halogen atoms being exchanged.

The dyestuffs of the present invention are suitable for dyeing or printing polyhydroxylated, especially cellulosic, materials including both synthetic fibers, for example, of polyvinyl alcohol, regenerated cellulose or viscose, and natural materials, for example, linen or above all cotton. There is advantageously used an aqueous solution of the dyestuff. Such a solution which advantageously contains a more or less neutral, and preferably inorganic, salt such as an alkali metal chloride or sulfate and, if desired, a preferably inorganic, acid-binding agent, such as a carbonate, phosphate, borate or perborate of an alkali metal or a mixture, especially a buffer mixture of such agents, is applied to the material to be dyed preferably in the cold or at a moderately raised temperature or, if no alkali is present, at a higher temperature, for example, 60° C. to 80° C. During the dyeing process the aforesaid dyestuff containing a labile halogen atom reacts with the polyhydroxylated material to be dyed whereby the dyestuff is fixed probably by chemical combination with the material. An acid-binding agent of more alkaline reaction than sodium carbonate may be added to the dyebath at the outset of the dyeing operation, but advantageously it is added in such manner that the pH value of the initially weakly acid, neutral or weakly alkaline dyebath gradually increases throughout the dyeing operation.

An advantageous method of dyeing is one in which the material to be dyed is not, as in direct-dyeing methods, impregnated as in a dyebath at a goods-to-liquor ratio of at least 1:3 and usually greater than 1:10, with only a portion of the quantity of dyestuff solution needed to produce the desired shade (so that the dyestuff dissolved in the dyebath can reach an equilbrium with the dyestuff deposited on the substratum to be dyed) and dyed therein by the dyestuff being gradually absorbed by the fiber or being urged from the dyebath onto the fiber by some means, but is impregnated with the whole of the dyestuff solution needed to produce the desired shade, or is printed with a printing paste containing the dyestuff, and the dyestuff so applied to the fiber is subsequently fixed thereon.

The fixation of the dyestuff on the material impregnated with the dyestuff solution is carried out after the impregnation. For this purpose, for example, the impregnated material, if desired, after being dried, and, if the impregnating solution contains no acid-binding agent, may be treated with an aqueous alkaline solution, for example, with a salt-containing solution of an alkali metal hydroxide, at a raised temperature or in the cold followed by a short heat treatment with steam or, for example, in a current of warm air. When a practically neutral impregnating bath free from substances yielding alkali is used, the material may be allowed to stand, if desired, for a long time, before the fixation treatment, and this may be of advantage having regard to the apparatus available. Instead of carrying out the fixation with the use of a separate alkaline bath, an alkali or substance yielding alkali, such as sodium carbonate, may be added to the impregnating solution at the outset, and then the impregnated material is steamed directly or subjected to a heat treatment without intermediate drying and without intermediate alkaline treatment.

The impregnating solution can be prepared by dissolving the appropriate dyestuff and, if desired, a more or less neutral inorganic salt in water simultaneously or in succession. The dyestuff and the salt may alternatively be made up into a paste-like or, preferably, dry preparation. The preparations used for making the impregnating solution may contain, in addition to or instead of a salt a non-electrolyte such as urea, and, if desired, also a buffer salt or agent capable of liberating an alkali, for example, when heated.

Instead of applying the dyestuffs by impregnation they may be applied to the material to be dyed by printing. For this purpose there is used, for example, a printing paste containing in addition to the usual printing assistants, for example, wetting and thickening agents, at least one of the dyestuffs of this invention, and, if desired, an acid-binding agent, or a substance capable of yielding an acid-binding agent.

Suitable assistants for the manufacture of the printing pastes are, for example, urea and thickening agents such as alkoxy cellulose, for example, methylcellulose, starches, alginates or the like.

Suitable acid-binding agents and substances yielding acid-binding agents are, more especially, alkali metal salts such as potassium cyanide, potassium carbonate, sodium carbonate or bicarbonate, di- and tri-sodium phosphate or mixtures of mon-, di and tri-sodium phosphate, and also alkali metal or alkaline earth metal hydroxides, more especially sodium hydroxide, when the printing paste to be used does not contain such an agent, the printed material is treated with an alkali preferably with a solution containing a salt in high concentration and an alkali metal carbonate or an alkali metal or alkaline earth metal hydroxide, and then subjected to the action of heat, if desired, in the presence of steam. When the printing paste contains an acid-binding agent or a substance of which the alkalinity increases, for example, when it is heated, the printed material needs no alkaline treatment before being heated or steamed.

By the process of this invention very valuable strong and generally very full dyeings and prints having excellent properties of wet fastness and of very good fastness to light are produced on polyhydroxylated, especially cellulosic, materials, even with those dyestuffs of the invention that possess no affinity or no pronounced affinity for cotton.

In certain cases it may be of advantage to subject dyeings or prints produced by the process of this invention to an after-treatment. Thus, for example, it may be of advantage to soap the dyeings in order to remove any incompletely fixed dyestuff. When the dyestuff used for dyeing or printing contains metallizable groups, the dyeing or print may be subjected to after-treatment with an agent yielding a heavy metal, more especially an agent yielding copper.

In the following examples which illustrate the invention, the parts and percentages are by weight unless otherwise indicated, the relationship of parts by weight to parts by volume being the same as that of the kilogram to the liter. Although the dyestuffs are referred to in the form of the free acids, they are used in the form of an alkali metal salt thereof:

Example 1

37 parts of the mono-condensation product of 1:4:5:8-naphthalene-tetracarboxylic acid with 1:2:3-triaminobenzene having the formula

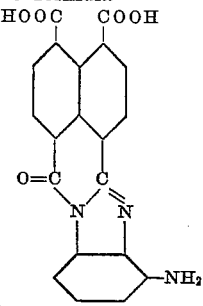

are dissolved in 500 parts of water with addition of sodium hydroxide solution, and the pH value of the solution is adjusted to 7.0. The whole is then cooled to 0° C. by adding 500 parts of ice and the clear solution is stirred into 18.5 parts of cyanuric chloride in 80 parts of acetone. At a temperature of 0 to 4° C. a total of 55 parts by volume of 2N-sodium carbonate solution is gradually added dropwise so that the pH value of the solution can be maintained constantly at 5.0 to 7.0, during which time the yellow-olive dyestuff begins to settle out gradually. The dyestuff of the formula

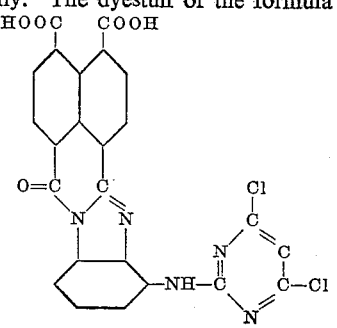

—which probably represents a mixture of the isomers— is completely salted out from the reaction solution with sodium chloride. It is filtered off and washed on the filter with a solution of 5 parts of disodium phosphate, 3 parts of monopotassium phosphate and 30 parts of sodium chloride in 200 parts of water, rapidly suctioned off, and dried in vacuo at 30 to 40° C.

The above dyestuff can be used to dye cotton and regenerated cellulose strong yellow tints of outstanding fastness to washing by the following method:

2 parts of the dyestuff are dissolved in 2000 parts of cold water. 100 parts of a sodium carbonate solution of 10% strength and 250 parts of a sodium chloride solution of 20% strength are then added. 100 parts of well-wetted cotton yarn are immersed at 20° to 30° C. in the dyebath thus prepared, and after 30 minutes another 250 parts of a sodium chloride solution of 20% strength are added. Dyeing is continued for 60 minutes at 25 to 35° C. The resulting reddish yellow dyeing is rinsed in cold water, soaped at 80 to 100° C., thoroughly rinsed in cold water and dried. A strong yellow dyeing is obtained which is very fast to washing.

An identical result is obtained when in the above example sodium carbonate is replaced by trisodium phosphate.

The mono-condensation product from 1:4:5:8-naphthalene-tetracarboxylic acid and 1:2:3-triaminobenzene, used in making the above dyestuff, can be obtained, for example, by heating the aqueous solution for 3 hours at 70 to 75° C. at a pH of 5.0 to 6.0 in the presence of sodium acetate.

Example 2

200 parts of ice are added with stirring to a solution of 19 parts of cyanuric chloride in 100 parts of acetone. The resulting fine suspension of cyanuric chloride is then poured into a solution, cooled to 0° C., of 14 parts of 4-aminobenzoic acid in 400 parts of water and 100 parts by volume of N-sodium hydroxide solution, and the whole is stirred at 0–4° C. and at pH=6.0 to 7.0 until aminobenzoic acid can no longer be detected.

This condensation product from equimolecular proportions of cyanuric chloride and 4-aminobenzoic acid is then treated with a neutral solution of 37 parts of the mono-condensation product from 1:4:5:8-naphthalene-tetracarboxylic acid and 1:2:3-triaminobenzene in 1000 parts of water. By gradually adding 200 parts by volume of N-sodium hydroxide solution at 50 to 60° C., the pH is kept constant between 6.0 and 7.5 until the condensation is complete.

By adding sodium chloride it is possible to precipitate the dyestuff of the formula

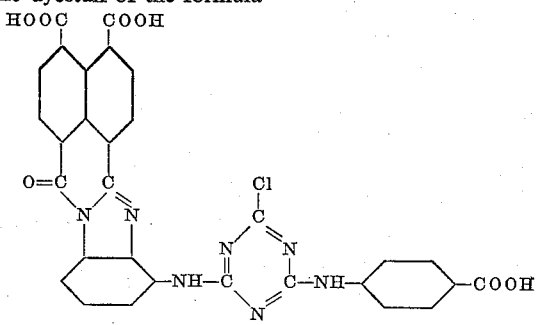

(which is probably present in the form of a mixture of the isomers) from its solution, whereupon it can be filtered off and dried in vacuo.

Strong yellow dyeings of excellent fastness to washing can be produced with this dyestuff on cotton and regenerated cellulose by the following method:

2 parts of the dyestuff are dissolved with 80 parts of trisodium phosphate in 400 parts of water and the solution is made up to 4000 parts. 80 parts of sodium chloride are added, 100 parts of a cotton fabric are immersed in this dyebath, the temperature is raised to 60° C. in the course of 30 minutes, another 80 parts of sodium chloride are added, the temperature is raised to 80° C. in the course of 15 minutes and kept at 80° C. for half an hour. The resulting yellow dyeing is then rinsed and soaped for 15 minutes in a boiling solution of a non-ionic detergent of 0.3% strength. A yellow dyeing is obtained.

The same result is attained in the above example when sodium carbonate is used instead of trisodium phosphate.

Dyestuffs of similar properties are obtained when the 4-aminobenzoic acid in this example is replaced by 2-aminobenzoic acid or 3-aminobenzoic acid.

*Example 3*

37 parts of the mono-condensation product from 1:4:5:8-naphthalene-tetracarboxylic acid and 1:2:3-triaminobenzene are dissolved in 1000 parts of water with the addition of sodium hydroxide solution, and the pH value of the solution is adjusted to 7.0. 34.3 parts of 2:4-dichloro-6-phenylamino-1:3:5-triazine-4'-sulfonic acid are then added in the form of an aqueous solution of the sodium salt heated to 40° C. 55 parts by volume of 2 N-sodium carbonate solution are then run in so that the pH value at a reaction temperature of 40 to 45° C. remains between 5.5 and 6.5. Finally, the dyestuff of the formula

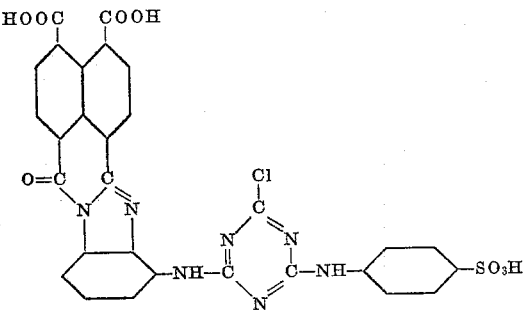

is salted out from its solution with sodium chloride, filtered off and dried in vacuo at 60 to 70° C. The dyestuff is probably a mixture of the isomers.

This dyestuff dyes cotton and regenerated cellulose brownish yellow tints of very good fastness to washing by the following method:

1 part of the dyestuff is dissolved in 100 parts of water, and this solution is used to impregnate a cotton fabric on the foulard at 20° C., and the excess of liquor is then squeezed off to leave 75% of dyestuff solution in the fabric calculated on its weight. The fabric impregnated in this manner is dried and then impregnated at room temperature with a solution containing per liter 10 grams of sodium hydroxide and 300 grams of sodium chloride, squeezed to a weight increase of 75% and then steamed for 60 seconds at 100 to 101° C., rinsed, treated in a sodium bicarbonate solution of 0.5% strength, rinsed, soaped for 15 minutes in a boiling solution of a non-ionic detergent of 0.3% strength, again rinsed and dried. A brownish yellow dyeing of very good fastness to washing results.

Dyestuffs having similarly good properties are obtained when in this example 2:4-dichloro-6-phenylamino-1:3:5-triazine-4'-sulfonic acid is replaced by 2:4-dichloro-6-phenylamino-1:3:5-triazine-2'-sulfonic acid or 2:4-dichloro-6-phenylamino-1:3:5-triazine-3'-sulfonic acid or the mono-condensation product from equimolecular amounts of cyanuric chloride and 2-aminonaphthalene-4:8-disulfonic acid.

*Example 4*

3.7 parts of the mono-condensation product from 1:4:5:8-naphthalene-tetracarboxylic acid and 1:2:4-triaminobenzene are dissolved in 100 parts of water with the addition of sodium hydroxide solution, and the pH value of the solution is adjusted to 7.0. By adding ice the solution is then cooled to 0° C. and the clear solution of 1.9 parts of cyanuric chloride in 15 parts of acetone is stirred in. At 0 to 2° C. the condensation proceeds very rapidly and the eliminated mineral acid is neutralized by the dropwise addition of 10 parts by volume of N-sodium hydroxide solution in a manner such that the pH value of the solution can be maintained between 5.0 and 7.0. The dyestuff of the formula

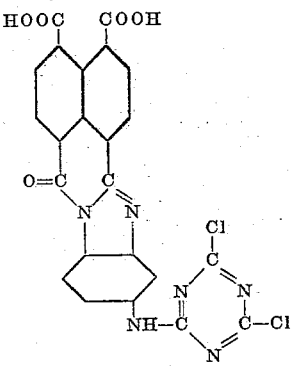

—which is probably present as a mixture of the isomers— is salted out from its solution with sodium chloride, filtered off and washed on the filter with a solution of 5 parts of disodium phosphate, 3 parts of monopotassium phosphate and 30 parts of sodium chloride in 200 parts of water, rapidly suctioned off and dried in vacuo at 30 to 40° C.

This dyestuff dyes cotton and regenerated cellulose by the method described in Example 1 strong yellow tints of very good fastness to washing.

*Example 5*

37 parts of the mono-condensation product from 1:4:5: 8-naphthalene-tetracarboxylic acid and 1:2:4-triaminobenzene are completely dissolved in 1000 parts of water with the addition of sodium hydroxide solution, and the pH value of this solution is adjusted to 7.0 34.3 parts of 2:4 - dichloro - 6 - phenylamino - 1:3:5 - triazine - 3'- sulfonic acid in the form of an aqueous solution of the sodium salt heated to 40° C. are then added, and 55 parts by volume of 2 N-sodium carbonate solution are run in so that at a temperature of 40 to 50° C. the pH value of the reaction solution can be constantly maintained between 5.5 and 7.0. Finally, the dyestuff of the formula

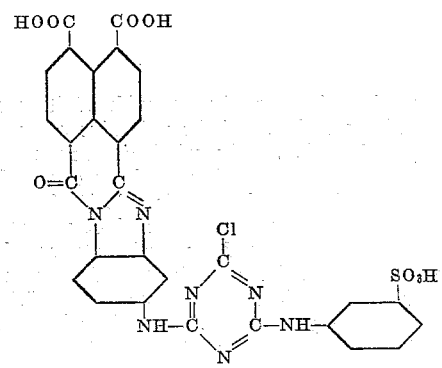

is salted out from its solution with sodium chloride, filtered off and dried in vacuo at 60° to 70° C. The dyestuff is probably present as a mixture of the isomers.

By the methods described in Examples 2 and 3 cotton and regenerated cellulose can be dyed strong yellowish brown tints of excellent fastness to washing.

Dyestuffs having similar properties are obtained when in this example 2:4-dichloro-6-phenylamino-1:3:5-triazine-3'-sulfonic acid is replaced by 2:4-dichloro-6-phenylamino-1:3:5-triazine-4'-sulfonic acid or by the mono-condensation product from cyanuric chloride and 2-aminonaphthalene-6-sulfonic acid.

The mono-condensation product from 1:4:5:8-naphthalene-tetracorboxylic acid and 1:2:4-triaminobenzene used in the example can be prepared, for example, at a pH value of 5.0 to 6.0 in the presence of sodium acetate by heating the aqueous solution for 6 hours at 70 to 75° C.

Example 6

200 parts of a solution containing 3.9 parts of the sodium salt of the probable formula

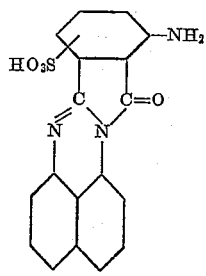

are condensed with an aqueous suspension of 1.9 parts of cyanuric chloride in 100 parts of ice-water at 0 to 4° C. with stirring. A total of 5.5 parts by volume of 2 N-sodium carbonate solution is added dropwise so that the mineral acid eliminated during the condensation is continuously neutralized at a pH value between 5.0 and 7.0. Finally, a reddish brown solution is obtained from which the dyestuff can be isolated with sodium chloride; it is filtered off, washed on the filter with a solution of 5 parts of disodium phosphate, 3 parts of mono-potassium phosphate and 30 parts of sodium chloride in 200 parts of water, rapidly suctioned off and dried in vacuo at 30 to 35° C.

This dyestuff contains a 2:4-dichloro-1:3:5-triazine residue; it dyes cotton by the method according to Example 1 brown tints of very good fastness to washing.

The starting material used in this example was prepared from the 11- (or 14-)-nitrophthalo-perinone(10) described in the literature (see Annals 365, page 126) by heating with chlorosulfonic acid on a waterbath and subsequently reducing the nitro group.

Example 7

200 parts of an aqueous solution containing 4.0 parts of the sodium salt of the probable formula

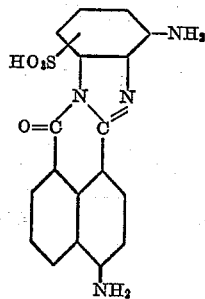

are mixed with 6.9 parts of the sodium salt of 2:4-dichloro-6-phenylamino-1:3:5-triazine-3'-sulfonic acid dissolved in 100 parts of water heated to 40° C. The mineral acid eliminated in the course of the condensation is continuously neutralized at a temperature of 50 to 60° C. with a total of 10 parts by volume of 2 N-sodium carbonate solution in a manner such that the pH value can be maintained between 5.0 and 7.0. On completion of the condensation the dyestuff is precipitated from its solution with sodium chloride, filtered off and dried in vacuo at 70° C.; it is probably present as a mixture of the isomers.

This dyestuff dyes cotton and regenerated cellulose by the methods described in Examples 2 and 3 yellowish brown tints of very good fastness to washing.

The starting material used in this example was obtained by condensing 4-nitronaphthalic acid and 1:2-diamino-3-nitro-benzene in boiling glacial acetic acid, sulfonating the condensation product with chlorosulfonic acid at 90 to 95° C. and subsequently reducing the two nitro groups.

Example 8

200 parts of the aqueous solution of 4.0 parts of the sodium salt of the probable formula

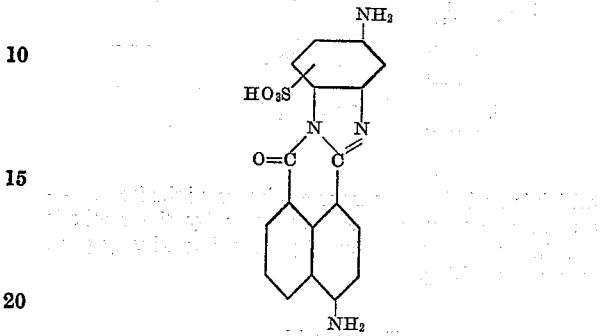

are condensed with 6.9 parts of the sodium salt of 2:4-dichloro-6-phenylamino-1:3:5-triazine-3'-sulfonic acid as described in Example 7, and the resulting dyestuff—which is probably present as a mixture of the isomers—is isolated.

The dyestuff dyes cotton and regenerated cellulose by the methods according to Examples 2 and 3 strong orange-brown tints of very good fastness to washing.

The starting material used in this example was obtained in a manner analogous to that described at the end of Example 7 by using 1:2-diamino-4-nitrobenzene instead of 1:2-diamino-3-nitrobenzene.

Example 9

37 parts of the mono-condensation product from 1:4:5:8-naphthalene-tetracarboxylic acid and 1:2:3-triaminobenzene are condensed with 18.5 parts of cyanuric chloride as described in Example 1. On completion of the condensation 150 parts by volume of 2 N-ammonia solution are added. The reaction mixture is heated to 35-40° C. and stirred at this temperature for 1 hour. The resulting dyestuff is precipitated from its solution with sodium chloride, filtered off and dried in vacuo at 80° C. This dyestuff of the formula

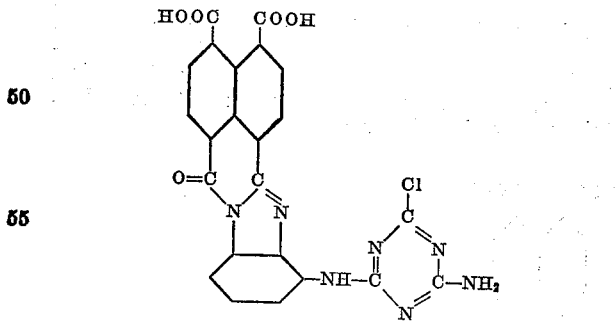

—which is probably present as a mixture of the isomers—dyes cotton and regenerated cellulose by the methods according to Examples 2 and 3 strong yellow tints of very good fastness to washing.

Example 10

2 parts of the sodium salt of 1-hydroxybenzene-3-sulfonic acid are added to a solution of 5.5 parts of the dyestuff described in Example 1 in 200 parts of water; the mixture is heated to 50 and 60° C. and as mineral acid is eliminated it is neutralized with stirring at a pH value of 5.0 to 7.0 with a total of 10 parts by volume of N-sodium hydroxide solution. The dyestuff is isolated from its solution with sodium chloride, filtered off and dried in vacuo at 70 to 80° C. This dyestuff of the formula

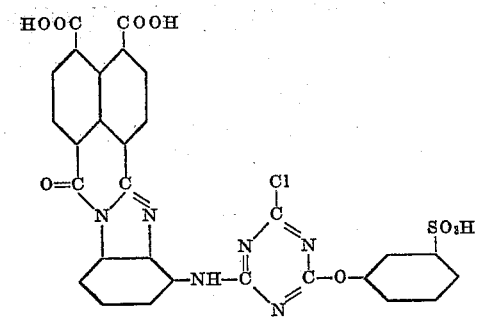

—which is probably present as a mixture of the isomers—dyes cotton and regenerated cellulose by the methods according to Examples 2 and 3 yellow tints of very good fastness to washing.

*Example 11*

A solution of 5.4 parts of the disodium salt of 1-amino - 4 - (4' - aminophenylamino) - anthraquinone-2:3'-disulfonic acid in 300 parts of water is added to a solution of 5.5 parts of the condensation product of the formula

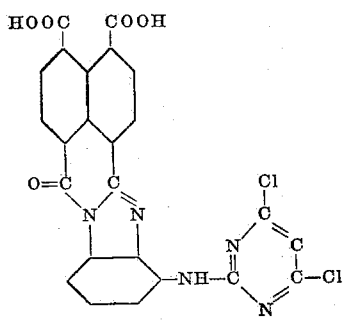

described in Example 1, in 200 parts of water. The mixture is heated to 40 to 50° C., and the eliminated mineral acid is neutralised with stirring at a pH value of 5.0 to 7.0 with a total of 10 parts by volume of N-sodium hydroxide solution. The dyestuff is salted out with sodium chloride, filtered off and dried in vacuo at 70 to 80° C. This dyestuff of the formula

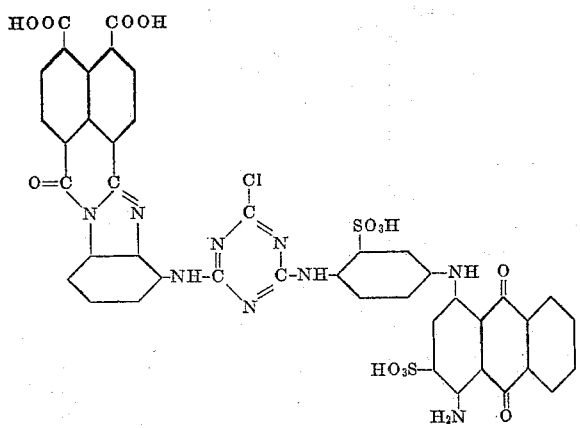

—which is probably present as a mixture of the isomers—dyes cotton and regenerated cellulose by the method according to Example 2 green tints of very good fastness to washing and light.

*Example 12*

6.3 parts of the sodium salt of the probable formula

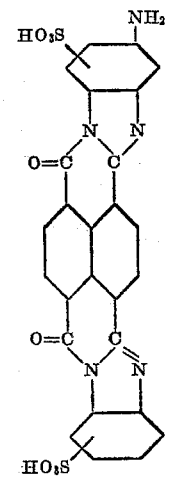

are dissolved in 300 parts of water. 3.4 parts of 2:4-dichloro 6-phenylamino-1:3:5-triazine-3'-sulfonic acid are added in the form of an aqueous solution of the sodium salt heated to 40° C. The mixture is heated with stirring to 60 to 70° C., and as it is eliminated, the mineral acid is neutralized with stirring at a pH value of 5.0 to 7.0 with a total of 10 parts by volume of N-sodium hydroxide solution. The dyestuff is salted out in the usual manner with sodium chloride, filtered off and dried in vacuo at 70 to 80° C.

The dyestuff—which is probably a mixture of the isomers—dyes cotton and regenerated cellulose by the methods according to Examples 2 and 3 reddish brown tints of very good fastness to washing.

The starting material used in this example was obtained by condensing naphthoylene-benzimidazole-1:8-dicarboxylic acid anhydride with 1:2-diamino-4-nitrobenzene, subsequent sulfonation with chlorosulfonic acid at 90 to 95° C. and reducing the nitro group.

*Example 13*

6.5 parts of the sodium salt of the probable formula

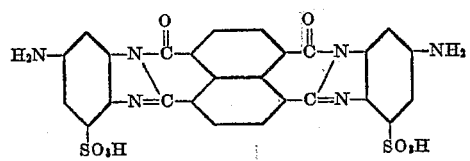

are dissolved in 300 parts of water. 6.8 parts of 2:4-dichloro - 6 - phenylamino - 1:3:5 - triazine - 3' - sulfonic acid dissolved in the form of the sodium salt in 200 parts of water and then added, the whole is heated to 50 to 60° C. and as the mineral acid is eliminated it is neutralized with stirring at a pH value of 5.0 to 7.0 with a total of 10 parts by volume of 2 N-sodium carbonate solution. The dyestuff—which is probably present as a mixture of the isomers—is salted out with sodium chloride, filtered off and dried in vacuo at 80° C.

The dyestuff dyes cotton and regenerated cellulose by the method according to Example 3 brown tints of very good fastness to washing.

The starting material used in this example was prepared by condensing 1:4:5:8-naphthalene-tetracarboxylic acid with 1:2:4-triaminobenzene-6-sulfonic acid in the molecular proportion of 1:2.

Example 14

4.0 parts of the mono-condensation product from 1:4:5:8-naphthalene-tetracarboxylic acid and 1:2:3-triaminobenzene are dissolved with the addition of sodium hydroxide solution in 200 parts of water, and the yellowish brown solution is adjusted to pH=7.0. At 0 to 2° C. a solution of 2 parts of β-chloro-propionyl chloride in 4 parts of toluene is added with vigorous stirring. The gradually eliminated mineral acid is continuously neutralized at 0 to 4° C. with N-sodium hydroxide solution so that the pH value of the solution is constantly maintained between 5.0 and 7.0. On completion of the reaction, when no more acid is eliminated, the pH value of the solution is adjusted to 8.5 by adding further sodium hydroxide solution. The dyestuff is then salted out from its solution with sodium chloride, filtered off and dried in vacuo at 70 to 80° C.

This dyestuff of the formula

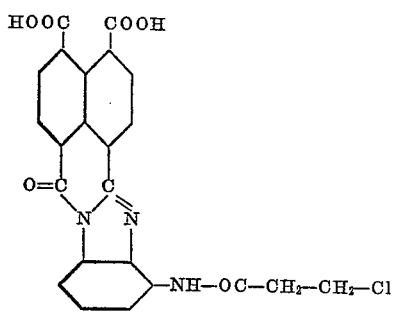

—which is probably present as a mixture of the isomers—dyes cotton and regenerated cellulose by the method according to Example 3 yellow tints of very good fastness to washing.

Example 15

200 parts of an aqueous solution of 4.0 parts of the sodium salt of the probable formula

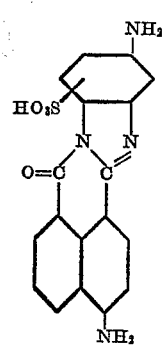

are mixed with thorough stirring at 0 to 2° C. with a solution of 4 parts of β-chloropropionyl chloride in 8 parts of toluene, and the gradually eliminated mineral acid is neutralized as described in Example 14. On completion of the condensation the dyestuff is salted out from its solution with sodium chloride, filtered off and dried in vacuo at 70 to 80° C.

This dyestuff of the formula

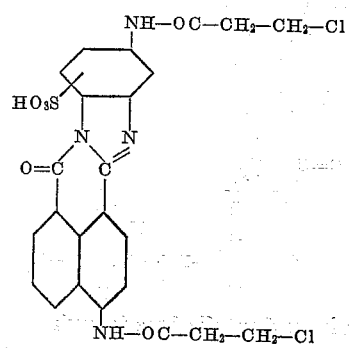

—which is probably present as a mixture of the isomers—dyes cotton and regenerated cellulose by the method according to Example 3 orange-yellow tints of very good fastness to washing.

What is claimed is:

1. A perinone dyestuff selected from the group consisting of compounds of the formula

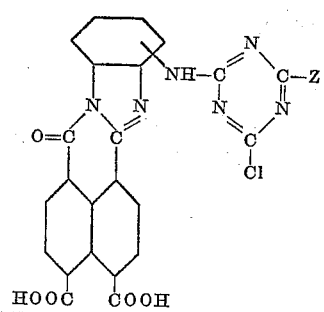

and

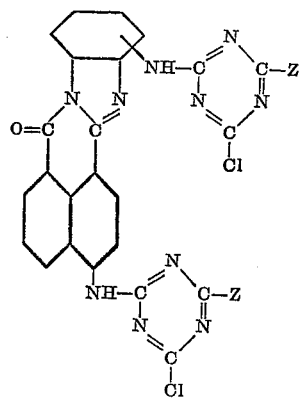

and

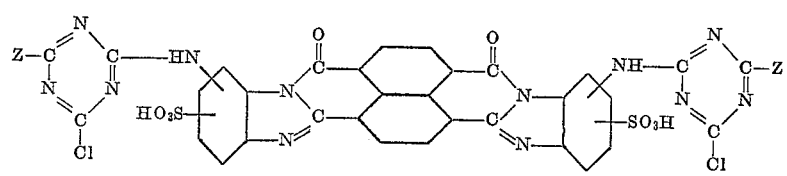

in which formulae Z is a member selected from the group consisting of Cl, hydroxy, amino, sulfophenylamino, carboxyphenylamino, sulfonaphthylamino, sulfophenoxy and (1'-amino-2'-sulfo-4'-anthraquinonylamino)-phenylamino.

2. The perinone dyestuff of the formula
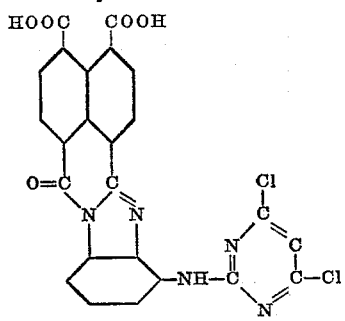
3. The perinone dyestuff of the formula
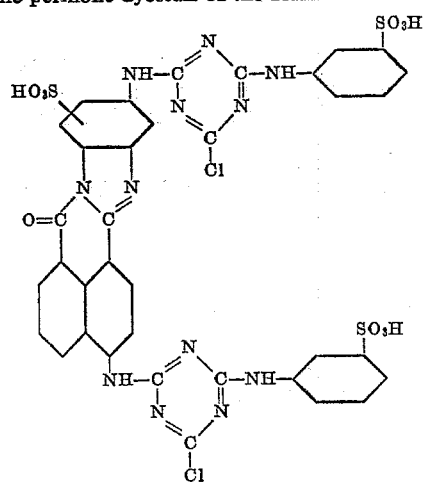
4. The perinone dyestuff of the formula
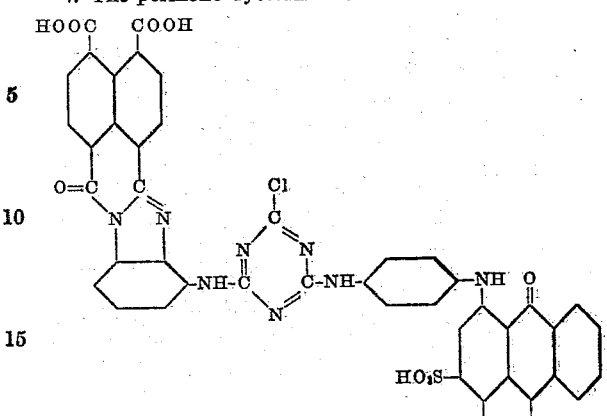
5. The perinone dyestuff of the formula
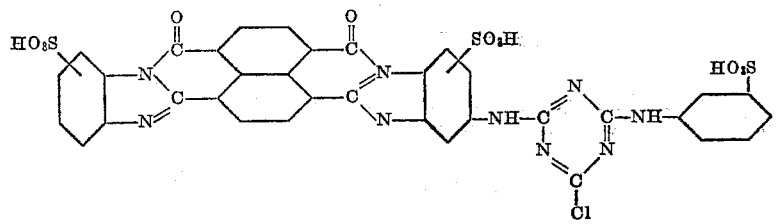
No references cited.

UNITED STATES PATENT OFFICE
Certificate of Correction

Patent No. 2,949,467 August 16, 1960

Max Staeuble

It is hereby certified that error appears in the above numbered patent requiring correction and that the said Letters Patent should read as corrected below.

Column 1, lines 33 to 39, the formula should appear as shown below instead of as in the patent:

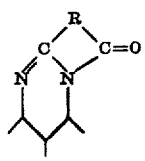

column 3, lines 12 to 15, for that portion of Formula (7) reading

column 4, line 75, for "mon-" read — mono- —; column 7, line 63, for "sullfonic" read —sulfonic—; column 12, lines 8 to 11, for that portion of the formula in Example 12 reading

column 16, for that portion of the formula in claim 5 reading

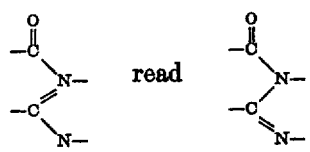

Signed and sealed this 6th day of June 1961.

[SEAL]

Attest:

ERNEST W. SWIDER,
*Attesting Officer.*

DAVID L. LADD,
*Commissioner of Patents.*